Patented June 15, 1926.

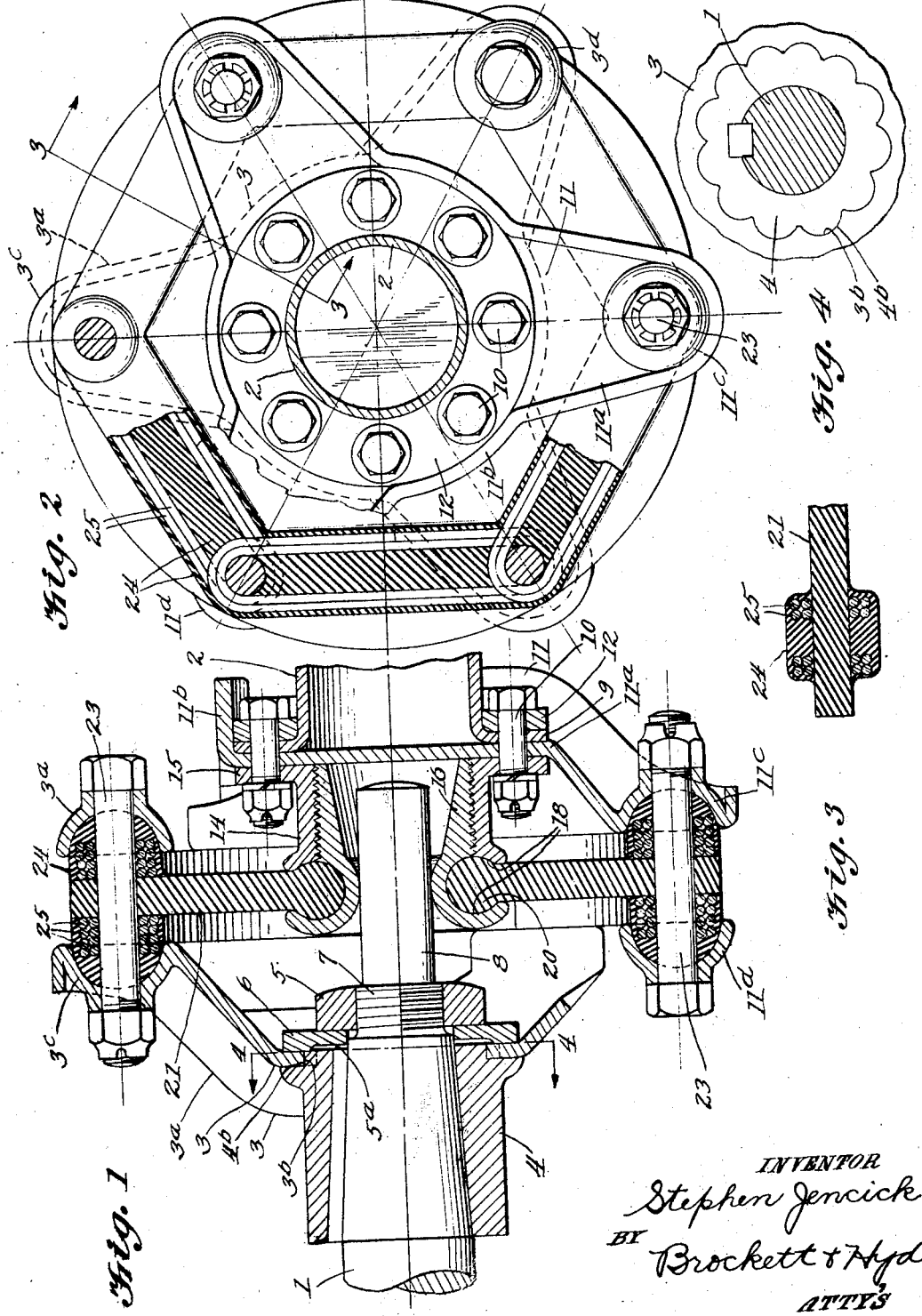

1,588,424

UNITED STATES PATENT OFFICE.

STEPHEN JENCICK, OF CHAGRIN FALLS, OHIO.

FLEXIBLE COUPLING.

Application filed April 11, 1921. Serial No. 460,450.

This invention relates to flexible couplings such as are used for connecting aligned shaft sections, especially when flexibility or freedom of movement between such shaft sections is required.

This invention is an improvement or modification of those described in my co-pending applications No. 377,623 and No. 377,624, both filed April 29th, 1920.

As in my other applications, the object of the present invention is to improve the connection between the two shaft sections so as to increase the strength of the coupling without the loss of flexibility and without material increase in the initial cost.

More particularly it is the object of the present invention to provide an improved manner of preparing the re-enforcing strands for the projections upon the opposite sides of the flexible discs so as to facilitate the handling of such strands in building up the re-enforcing projections and also to increase the strength of such re-enforcing means especially at the bolt holes.

Another object of this invention is to provide means for centering the shaft sections as well as the bolts and bolt holes upon assembling the several parts of the coupling, and at the same time to provide a bearing means between the adjacent ends of the shaft sections so as to relieve the strain upon one of the shaft sections incident to its length.

Other objects of this invention will be apparent from the following description and claims when considered together with the accompanying drawings.

Fig. 1 is a longitudinal section through the coupling; Fig. 2 is an end elevation showing one shaft in section and with parts broken away; Fig. 3 is a section taken on the line 3—3, Fig. 2; and Fig. 4 is a section on line 4—4, Fig. 1, and showing the interlocking serrated portions between one of the shaft sections and the corresponding frame member.

The two shaft sections to be connected are indicated in the present drawings as 1 and 2 respectively. The frame member 3 is attached in any suitable manner to the sleeve 4 which is keyed upon the shaft 1. In the present case the frame member 3 is secured by means of the screw nut 5 in clamping engagement with the washer 6 engaging the central portion of the frame member. The outer thickened portion of washer 6 clamps the serrated or toothed edge 3$^b$ of the member 3 and the correspondingly formed surface 4$^b$ on the sleeve 4 in firm interlocked engagement, the outer part of washer 6 being sufficiently thick to insure such engagement before the inner portion of said washer reaches its limit of engagement as indicated by the space 5$^a$. The shaft 1 extends beyond the screw threaded portion 7 and terminates in a stud 8 for a purpose which will later appear. The shaft 2 which is here shown as being hollow is provided with the annular flange 9 through which extend the bolts 10 for clamping the flanged portions of the shaft in engagement with the central portion of the frame member 11. An annular washer 12 is also provided. The annular members 14 and 16 may also be held in clamped engagement with the central portion of the frame member 11 by means of the bolts 10 extending through the annular flange portion 15 of annular member 14. The edge of flange 9 is cut to exactly fit against flanges 11$^b$ and the drive connection is through the frictional engagement between the parts clamped together by bolts 10 so that the strain upon the bolts 10 themselves is relieved and the danger of stripping these bolts is thereby minimized. The accurate fitting of the flange 9 against flanges 11$^b$ serves also to center the parts for insertion of the bolts 10. The member 14 has also screw threaded engagement with the annular bearing member 16 and these two annular members are so formed as to together provide an annular channel or groove indicated at 18 for the purpose of receiving the substantially cylindrical re-enforced marginal portion 20 about the central opening of the flexible disc 21. The stud 8 is adapted also to extend into the annular bearing member 16 for the purpose of centering the shaft members in coupling the same and to relieve the strain upon shaft 1 by affording a bearing for the same. The stud extension and members 14 and 16 may, however, be omitted.

As indicated in the drawings, the frame members 3 and 11 are each provided with the three radially extending arms 3$^a$ and 11$^a$ respectively, which are arranged alternately. These arms are provided with circumferentially disposed cup shaped flanges 3$^c$ and 11$^c$ respectively, suitably apertured to receive the clamping bolts 23 which extend through the registering apertures in knobs of the re-enforcing projections 24. The flanges 3ᶜ and 11ᶜ and also the washers 3ᵈ and 11ᵈ are of substantially semi-spherical form so as to snugly clamp the projections 24 which are of corresponding form at the bolt holes, and the edges of these flanges and washers terminate short of the disc 21 when the parts are assembled so as to preserve a space as indicated in the drawings. These projections are built up of material having substantially the same coefficient of flexibility as the main body of the disc 21 which consists of sheet rubber or laminated rubber and fabric or other suitable material as may be desired. The projections 24 may be further re-enforced by means of strands 25 of suitable fabric which are imbedded therein and which are arranged closely about the bolt holes so as to hug the bolts. The projections 24 are practically flat between the bolt holes and extend in straight lines, as do also the strands 25, that is, in the direction of the strain. These strands are first prepared in the form of loop units of sufficient length to extend about the adjacent bolt holes as indicated in Fig. 2 of the drawings and may be provided with a suitable coating which can be fused into the material forming the main body of the projections 24 by the vulcanizing process. Any number of these strands 25 can be prepared in this way so as to form a unit, there being four of such strands here shown as composing such a unit. These units can be stored after preparation and readily applied to the material used in building up the projections 24. As indicated in Fig. 2 of the drawings, the adjacent ends of such units overlap at the bolt holes and as a result of this particular structure considerable strength is realized at these points. According to my invention most of the strain due to the torque is placed upon and taken up by the re-enforcing strands.

The advantages flowing from this invention will be apparent to those who are familiar with the art to which it relates.

Having described my invention, I claim:

1. A coupling member, comprising a disc of flexible material provided with bolt holes through said disc, and looped re-enforcing strands extending about said bolt holes.

2. A coupling member, comprising a disc of flexible material provided with bolt holes through said disc, and looped re-enforcing strands extending between and about said bolt holes.

3. A coupling member, comprising a disc of flexible material provided with bolt holes through said disc, and looper re-enforcing strands incorporated with said disc and extending about said bolt holes.

4. A coupling member, comprising a disc of flexible material adapted for connection between the adjacent ends of shaft sections, and looped re-enforcing strands arranged to relieve torsional strain upon said disc.

5. A coupling member, comprising a disc of flexible material having at least one face provided with re-enforcing projections and having bolt holes through said projections and disc, and looped re-enforcing strands embedded in said projections and extending about said bolt holes.

6. A coupling member, comprising a disc of flexible material provided upon its opposite faces with registering re-enforcing projections and having bolt holes through said projections and disc, and looped re-enforcing strands embedded in said projections and extending about said bolt holes.

7. A coupling member, comprising a disc of flexible material provided with re-enforcing projections and having bolt holes through said projections and disc, and looped re-enforcing strands embedded in said projections and extending between and about said bolt holes.

8. A coupling member, comprising a disc of flexible material provided upon its opposite faces with registering re-enforcing projections and having bolt holes through said projections and disc, and looped re-enforcing strands embedded in said projections and extending between and about said bolt holes.

9. A coupling member, comprising a disc of flexible material provided with circumferentially extending re-enforcing projections and having bolt holes through said projections and disc, and looped re-enforcing strands embedded in said projections and extending about said bolt holes.

10. A coupling member, comprising a disc of flexible material provided with re-enforcing projections and ribs connecting the same and having bolt holes through said projections and disc, and looped re-enforcing strands embedded in said projections and extending about said bolt holes.

11. A coupling member, comprising a disc of flexible material provided with re-enforcing projections and ribs connecting the same and having bolt holes through said projections and disc, and looped re-enforcing strands embedded in said projections and ribs and extending between and about said bolt holes.

12. A coupling disc, comprising a flexible disc adapted for connection between the adjacent ends of shaft sections, looped re-enforcing strands arranged to relieve torsional strain upon said disc, and means for centering the adjacent ends of said shaft sections.

13. A coupling disc, comprising a flexible disc provided with a central aperture and adapted for connection between the adjacent ends of shaft sections, means integral with said disc for re-enforcement at the points of connection between said disc and shaft sections, and means arranged within the central aperture of said disc for centering the adjacent ends of said shaft sections, said centering means including a portion engaging said disc at the margin of its central aperture.

14. A coupling device, comprising shaft members, a flexible disc provided with a central aperture surrounded by a bead portion, and means for connecting said shaft members through said disc, one of said shaft members being provided with a stub end portion extending through the aperture of said disc, and the other shaft member being provided with a bearing for the marginal bead portion of said disc about its central opening and also for said stub end portion, thereby providing a means of centering the parts in assembling the same.

15. A flexible disk having a body portion of vulcanizable material; and a series of links at the periphery of the body portion and secured thereto.

16. A flexible disk for couplings having a body portion and a series of links at each side thereof, the end of one link overlapping another and forming enlargements; and holes at the enlargements for the passage of the securing bolts.

17. A flexible disk for couplings consisting of a body portion of fabric and rubber; and a series of fabric and rubber links located at each side of the disk at the periphery thereof, the end of one link overlapping the end of another link so as to increase the thickness of the disk where the links overlap, the disk being perforated at the enlargements for the passage of the bolts which secure the disk to the spiders of the coupling.

In testimony whereof I hereby affix my signature.

STEPHEN JENCICK.